US008215436B2

(12) United States Patent
DeGrave et al.

(10) Patent No.: US 8,215,436 B2
(45) Date of Patent: Jul. 10, 2012

(54) HYBRID TRAILER SYSTEM

(76) Inventors: Ken DeGrave, Wilson, MI (US); William McMillan, Hendersonville, TN (US)

( * ) Notice: Subject to any disclaimer, the term of this patent is extended or adjusted under 35 U.S.C. 154(b) by 864 days.

(21) Appl. No.: 11/968,845

(22) Filed: Jan. 3, 2008

(65) Prior Publication Data
US 2008/0169144 A1    Jul. 17, 2008

Related U.S. Application Data

(60) Provisional application No. 60/883,215, filed on Jan. 3, 2007, provisional application No. 60/883,219, filed on Jan. 3, 2007, provisional application No. 60/950,014, filed on Jul. 16, 2007.

(51) Int. Cl.
*B60L 11/00* (2006.01)
*B62D 61/12* (2006.01)

(52) U.S. Cl. ................ 180/165; 180/65.22; 180/209

(58) Field of Classification Search ............... 180/165, 180/14.1, 14.2, 14.4, 14.7, 235, 243, 65.21
See application file for complete search history.

(56) References Cited

U.S. PATENT DOCUMENTS

| | | | | | |
|---|---|---|---|---|---|
| 3,182,742 | A | * | 5/1965 | Dow | 180/14.1 |
| 3,406,439 | A | * | 10/1968 | Hutchens | 29/897.2 |
| 3,860,081 | A | * | 1/1975 | Moll et al. | 180/14.3 |
| 4,005,779 | A | * | 2/1977 | Andrews | 212/87 |
| 4,685,527 | A | * | 8/1987 | Oswald et al. | 180/14.3 |
| 4,762,191 | A | * | 8/1988 | Hagin et al. | 180/14.2 |
| 4,984,852 | A | * | 1/1991 | McNinch, Jr. | 303/15 |
| 5,137,296 | A | * | 8/1992 | Forman | 280/407.1 |
| 5,707,115 | A | * | 1/1998 | Bodie et al. | 303/3 |
| 6,390,215 | B1 | * | 5/2002 | Kodama et al. | 180/65.22 |
| 6,516,925 | B1 | * | 2/2003 | Napier et al. | 188/112 A |
| 6,866,350 | B2 | * | 3/2005 | Palmer et al. | 303/152 |
| 6,880,651 | B2 | * | 4/2005 | Loh et al. | 180/14.2 |
| 7,147,070 | B2 | * | 12/2006 | Leclerc | 180/14.2 |
| 7,447,585 | B2 | * | 11/2008 | Tandy et al. | 701/70 |
| 2004/0005811 | A1 | * | 1/2004 | Gravolin | 439/503 |
| 2008/0012695 | A1 | * | 1/2008 | Herschell et al. | 340/431 |

FOREIGN PATENT DOCUMENTS

DE          3918083       * 12/1990

* cited by examiner

*Primary Examiner* — J. Allen Shriver, II
*Assistant Examiner* — Bridget Avary
(74) *Attorney, Agent, or Firm* — Wayne Edward Ramage; Bahan Donelson

(57) ABSTRACT

A system and related method for a regenerative braking system on a towed vehicle, such as a trailer or semi-trailer. The system provides power and braking to the respective trailer wheels, as needed, to help stabilize the trailer. Power is regenerated during braking. While batteries may be used to store the energy, the system also may use capacitive storage units, which charge and discharge large amounts of energy at a fast rate. A multiple-axis sensor system in conjunction with wheel sensors, load sensors, and proportional control of the brakes and motor power to the axles and wheels, is used to achieve superior load stabilization. The invention can be easily retrofit into new or used trailers, and is self-contained with low maintenance.

20 Claims, 8 Drawing Sheets

HYBRID TRAILER SYSTEM

This application claims benefit of, and priority to, U.S. Provisional Patent Application No. 60/883,215, filed Jan. 3, 2007, U.S. Provisional Application No. 60/883,219, filed Jan. 3, 2007, and U.S. Provisional Patent Application No. 60/950,014, filed Jul. 16, 2007, each entitled "HYBRID TRAILER SYSTEM." The complete specifications, drawings, attachments and disclosures of U.S. Provisional Patent Application Nos. 60/883,215, 60/883,219 and 60/950,014 are incorporated herein by specific reference.

FIELD OF INVENTION

This invention relates to a hybrid trailer system and apparatus. More particularly, the invention relates to a system and apparatus for placing one or more motors on a trailer to assist in operation of the trailer.

BACKGROUND OF THE INVENTION

At present, there are no trailer axle assemblies known being produced that can collect kinetic energy during deceleration of the vehicle, and retrieve that energy for acceleration. In particular, there is no such assembly in a package that can be easily retrofit into new or used trailers, including semi-trailers, that is completely self-contained, and can be connected to an ordinary, unmodified semi-tractor. Conventional semi-tractors do not have the room to add a new or retrofit hybrid system.

Current tractor trailers received their power from an ICE located in the tractor. The trailer provides only the means to handle the load. When an ICE tractor accelerates from rest, the engine emits large amounts of pollutants. ICE does not have high torque from zero to low RPMs. When the tractor decelerates, the brakes from the tractor and trailer must dissipate large amounts of kinetic energy through heat or by "jake braking," the process by which the energy is pushed back through the ICE causing large amounts of noise.

Current tractor-trailer systems also have a lower response time to traffic flow changes due to the heavy load being hauled. A tractor's ICE can only provide so much power for quick acceleration.

Some semi-trailers are equipped with ABS (anti-lock breaking system) as a part of their braking systems to help stabilize the trailer. ABS only helps the trailer wheels get better traction during deceleration, however.

The use of batteries to power an electric motor on a semi-trailer is known, but a problem with the use of batteries is the high amount of power that these devices must absorb in a short period of time during braking. Batteries can hold large amounts of power, in general, but they charge and discharge at slow rates. Increasing the charge and discharge rates results in a shortened lifespan of the battery. In addition, all batteries have a limited life span, and need to be replaced periodically. Batteries also contain corrosive elements that can spill if damaged.

Accordingly, what is needed is a system to collect kinetic energy during deceleration of the vehicle, and retrieve that energy for acceleration, while being easily retrofit into new or used trailers, including semi-trailers. The system should be self-contained that is completely self-contained, and can be connected to an ordinary, unmodified semi-tractor. The system also needs to charge and discharge large amounts of energy at a fast rate, and should have a multiple-axis detection system.

SUMMARY OF THE INVENTION

In one exemplary embodiment, the present invention comprises a system and method for towing a trailer, including but not limited to a semi-trailer, which overcomes the above drawbacks of prior art systems and methods. The invention can be easily retrofit into new or used trailers, and is self-contained with low maintenance. By placing the system in or on the trailer, the system becomes a hybrid system.

The system provides power and braking to the respective trailer wheels, as needed, to help stabilize the trailer. While batteries may be used to store energy, the system also may use capacitive storage units, which charge and discharge large amounts of energy at a fast rate. Said units also are safer than batteries when damaged.

In an exemplary embodiment, the present system has a multiple-axis sensor system. A three-axis accelerometer system can detect the vehicle's acceleration and deceleration (x-axis), inclination and turning force (y-axis), and how rough the road is, and whether the trailer has gone off the side of the road (z-axis). With wheel sensors, load sensors, and proportional control of the brakes and motor power to the axles and wheels, superior load stabilization can be achieved.

The present system allows for quieter and even silent regenerative braking of the trailer after the energy storage systems have reached capacity by using resistive load banks, thereby eliminating the need for "Jake breaking."

DETAILED DESCRIPTION OF THE INVENTION

Figure 1:
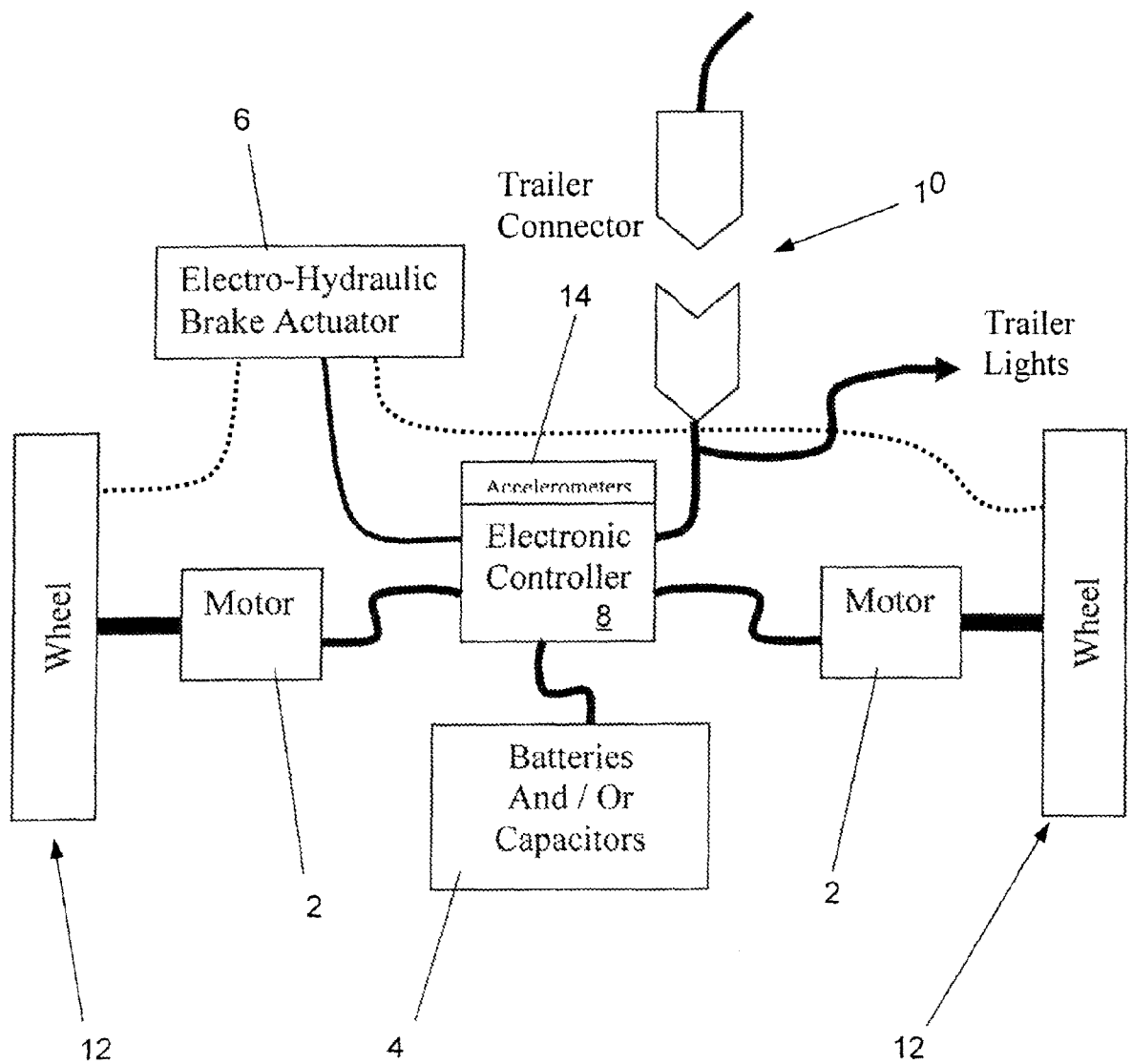
FIG. 1 shows a schematic diagram of a dual motor trailer configuration in accordance with one embodiment of the present invention.

The present invention is a system and apparatus for a hybrid trailer. FIG. 1 shows an exemplary embodiment of the present invention comprising two motors 2 in electrical connection with an energy storage system 4, a brake actuator 6, and an electronic controller 8. The electronic controller 8 monitors the trailer connector 10 for a variety of signals for operator action, including but not limited to braking, turn signals, and back-up signals. The trailer connector 10 also can monitor in real-time a variety of trailer operations, including but not limited to the speed of one or more trailer wheels 12, torque, and one or more accelerometers 14 or similar sensors 15. The energy storage system 4 may comprise one or more energy storage devices, including but not limited to batteries, capacitors 20, or some combination thereof.

Capacitors 20 as means of energy storage have several advantages. Capacitors can store energy at fast rates. The regenerative energies from a trailer, including a semi-trailer, need to be transferred from the vehicle's momentum to a stored charge in a matter of seconds. Capacitors can handle these rates without degradation in operational life, whereas batteries cannot. Capacitors have a discharge half-life within a period of days, which is adequate for the starting and stopping to which the typical trailer is subjected.

Batteries, even if properly maintained (e.g., proper temperature, fluid levels, and proper discharging/charging), have a lifetime of only a few years. Capacitors, on the other hand, can last decades before replacement. In addition, supplemental power, such as through a 7-pin signal cable, can supply enough energy to boost the generator to charge depleted storage capacitors or other energy storage devices.

Figure 2:
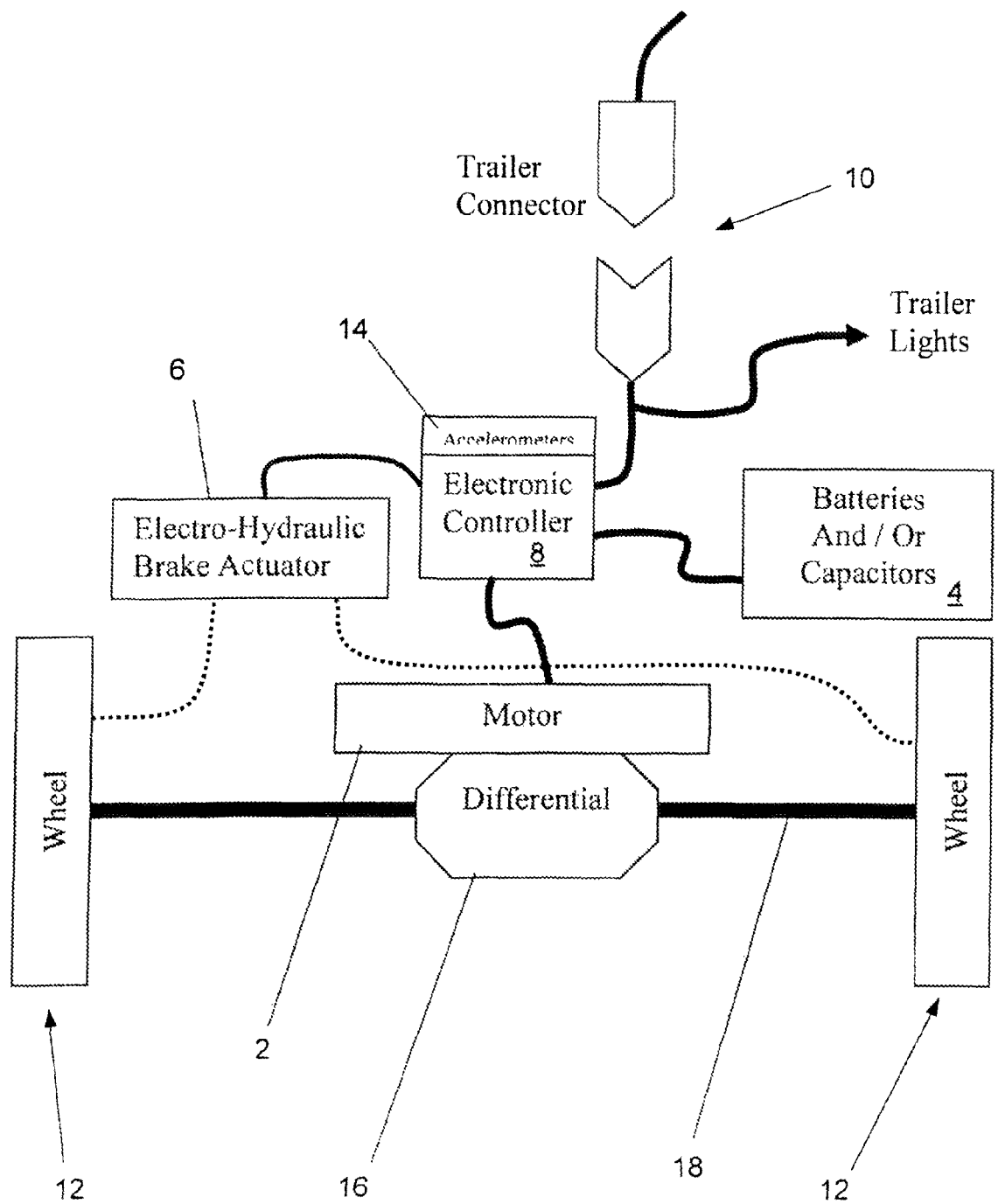
FIG. 2 shows a schematic diagram of a single motor trailer configuration in accordance with another embodiment of the present invention.
Figure 3:
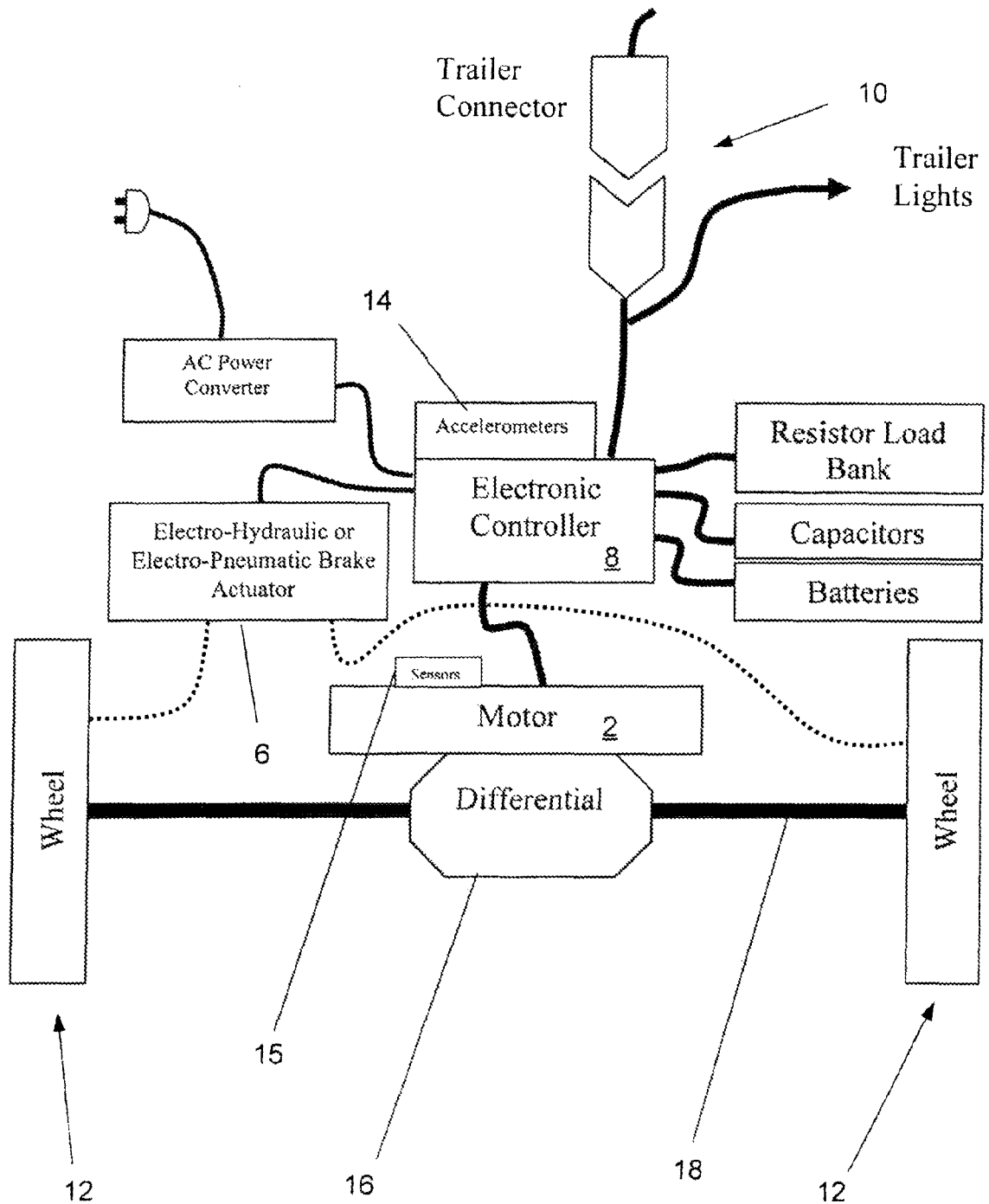
FIG. 3 shows a schematic diagram of a single motor trailer configuration in accordance with another embodiment of the present invention.

FIG. 2 shows another exemplary embodiment comprising a single motor 2. In this configuration, the motor is connected to the wheel axle 18 through the differential 16. FIG. 3 shows yet another exemplary embodiment comprising a single motor 2.

In other configurations, a motor 2 can be placed on each axle 18 of the trailer, or a motor 2 can be used in conjunction with each wheel 12. Alternatively, a single motor 2 can be used for a trailer regardless of numbers of axles or wheels.

Motors 2 can be mounted in a variety of ways and locations on the trailer, including hub mounting, axle mounting, differential mounting, or frame mounting. The motor or motors 2 power the axles or wheels of the trailer, and recover energy through regenerative braking. Power may also be provided or generated from the vehicle pulling the trailer, or by a power generator located on the trailer. Power is transferred to the trailer axles and wheels by typical means, such as differentials and/or gear trains. Means of storing and releasing energy can be electrical, hydraulic, pneumatic, or similar means.

A motor without magnets such as an induction or switched reluctance motor is able to freewheel when in normal trailer operation without generating any unneeded voltages. Accordingly, in one embodiment, use of such motors simplifies the design of the power-switching electronics for the motor and generator. A switched reluctance motor can produce large amounts of torque at zero and low speeds, which is desired. This type of motor also is synchronous, thus instantaneous changes in speed and torque can be made.

Placing one or more motors on a trailer as described above assists various aspects of operation of the trailer. These operations include towing and hitching. In addition, the invention promotes safety in operation, including assisting in preventing jack-knifing, controlling swerving, and control of the trailer during breakaways. The system also can counter shifting in the trailer load during operation (which often happens when transporting live animals or liquids). The controller compensates through accelerations and braking of the trailer wheels as appropriate to keep control. This also assists in stability control when encountering speed bumps, potholes, or driving or falling off the edge of the roadway.

Power can be provided to assist the pulling vehicle when starting or accelerating, and in start-and-go driving conditions. The internal combustion engine of the pulling vehicle must produce high power at low speeds at high torque when pulling from a stop or slow rate of speed. The pulling vehicle engine under these conditions typically emits high levels of pollutants, has low fuel mileage, and operates at the low end of its efficiency curve. The motor or motors 2 can ease this load by providing power to the trailer wheels, easing the load on the pulling vehicle and causing the pulling vehicle engine to be more efficient. Power may also be provided during conditions where the towing load on the pulling vehicle is increased, such as when the trailer is being towed in hilly conditions.

With the boost in power during acceleration and when going up an incline, the towing vehicle can reach a particular speed more quickly and without expelling large amounts of pollutants. The regenerative braking during decelerations and when going down a decline recharges the system. Together, this balances the energy loading of the system.

The electronic controller controls the application of power depending on input from various sensors or accelerometers 14, 15, wheel speed, trailer connector inputs, and various other sources of input. In one exemplary configuration, dual accelerometers may be placed at a 90 degree angle relative to each other, with each at approximately 45 degrees relative to longitudinal axis of the trailer (i.e., at 45 degrees relative to the direction of travel). The vector mathematics of the two accelerometers, along with wheel speed and other inputs, enables the electronic controller to determine if the trailer is going up or down a hill, hitting a bump or pothole, turning a corner, accelerating, or braking.

Accelerometers 70, 72, 74 on two or three (or more) axes may be used. In the three axis configuration, this provides three axes of acceleration and angle to effectively monitor the trailer's status. The x-axis 70 monitors acceleration and deceleration of the trailer (i.e., along its length), and the angle of inclination of the trailer. The y-axis 72 monitors the turning force, or side-to-side motion, and the banking of the road. This information, along with the monitoring of the inner and outer free-wheeling speed sensors on a non-powered axle, can tell the system electronics the degree and rate of turn. The z-axis 74 monitors a component of vertical motion, so as to monitor the smoothness of the road, and other inconsistencies such as pot holes or one set of wheels coming off the side of the road onto the shoulder. The three axes can be at substantially right angles to each other, but need not be. The system can brake the wheels individually, and power others, to keep the trailer stable.

In one embodiment, the system monitors wheel speeds and accelerometer direction and magnitude for indication of acceleration. Wheel speed can be measured in a variety of ways, including, but not limited to, wheel speed sensors 24. By applying an incremental torque and watching the wheel speed the controller can calculate the mass of the trailer load. The controller can then apply the proper amounts of torque to assist in acceleration without pushing the vehicle.

By monitoring signal lines 36 and the pneumatic brake lines 38, the system of the present invention can obtain an indication of what the driver (and the towed vehicle) is doing. The pneumatic valve bank 40 can monitor the incoming pressure from the towing vehicle and the outgoing pressure to the individual pneumatic brakes 44. By monitoring the feedback pressure of each wheel's brake lines, and their respective wheel speeds, the system can determine how the brake for that wheel is performing. Monitoring of pressure can be accomplished by one or more pressure sensors 42. The system can brake the wheels individually and power others to keep the trailer stable. This combination of braking and powering at the same time will help the trailer track the towing vehicle. This is of importance in all driving situations, including, but not limited to, straight-aways, curves (e.g., by applying more power to the outer wheels than the inner wheels), and circumstances where there is a difference in road mediums (e.g., one set of tires off in the shoulder and the other on the blacktop road; dirt roads; wet roads; and icy roads). Because the system of the present invention can determine if the road conditions are slippery (such as due to ice, snow, water, or other substances on the road), it can take proper precautions in the method of braking and motoring, or, if the situation arises, turn itself off.

Power can be regained through regenerative braking. The present system can watch the brake signal from the trailer connector, the deceleration of wheel speeds, and/or the accelerometer direction and magnitude data for indication of braking conditions. Regenerated energy would be stored in the energy storage system 4, which may include one or more batteries or capacitors 20 as described above, until the energy storage system is fully charged. Regenerative braking thus may occur until the energy storage system is fully charged, or until the wheel speed has dropped to a minimum level. Normal braking, such as hydraulic braking, can then take over. The electronic controller can apply the proper amount of braking to each wheel, or to the wheels on each side of the trailer, to keep the trailer from "pushing" the towing vehicle and thereby reduce the potential of jack-knifing or other dangerous conditions during operation.

In one exemplary embodiment, an electro-hydraulic brake actuator 6 may be used as the regenerative braking interface. Said actuator may comprise a large capacity reservoir, hydraulic pump, solid state electronics, and adjustable pressure output to the brakes via an interface, such as a serial interface. When regenerative braking is in effect, the hydraulic brakes provide the proportion of braking that needs to be made up for the appropriate deceleration. As the trailer slows down, the regenerative braking becomes less prominent, and the hydraulic braking finishes the stop.

Figure 5:
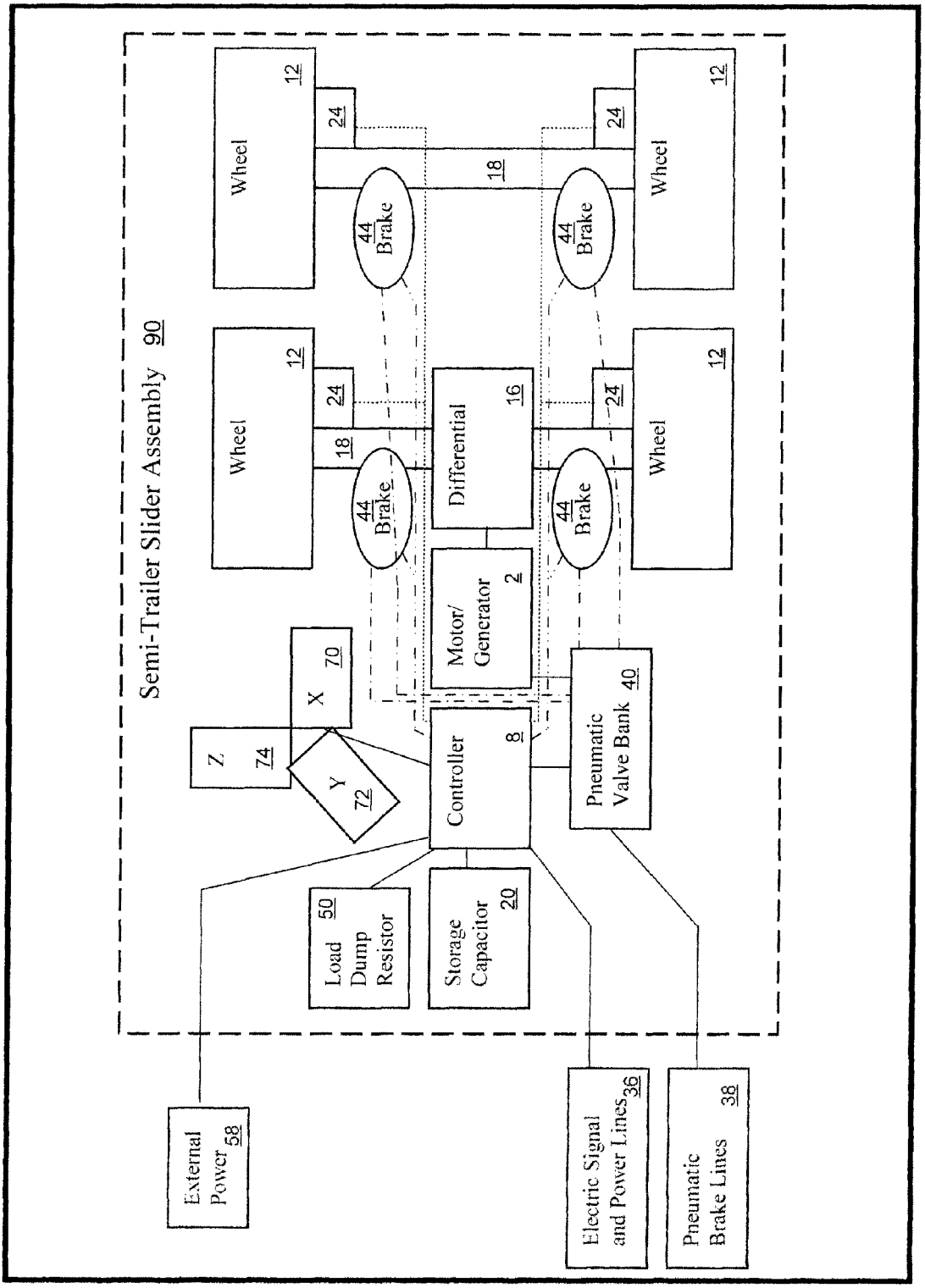
FIG. 5 shows a schematic diagram of a semi-trailer slider assembly in accordance with another embodiment of the present invention.
Figure 6:
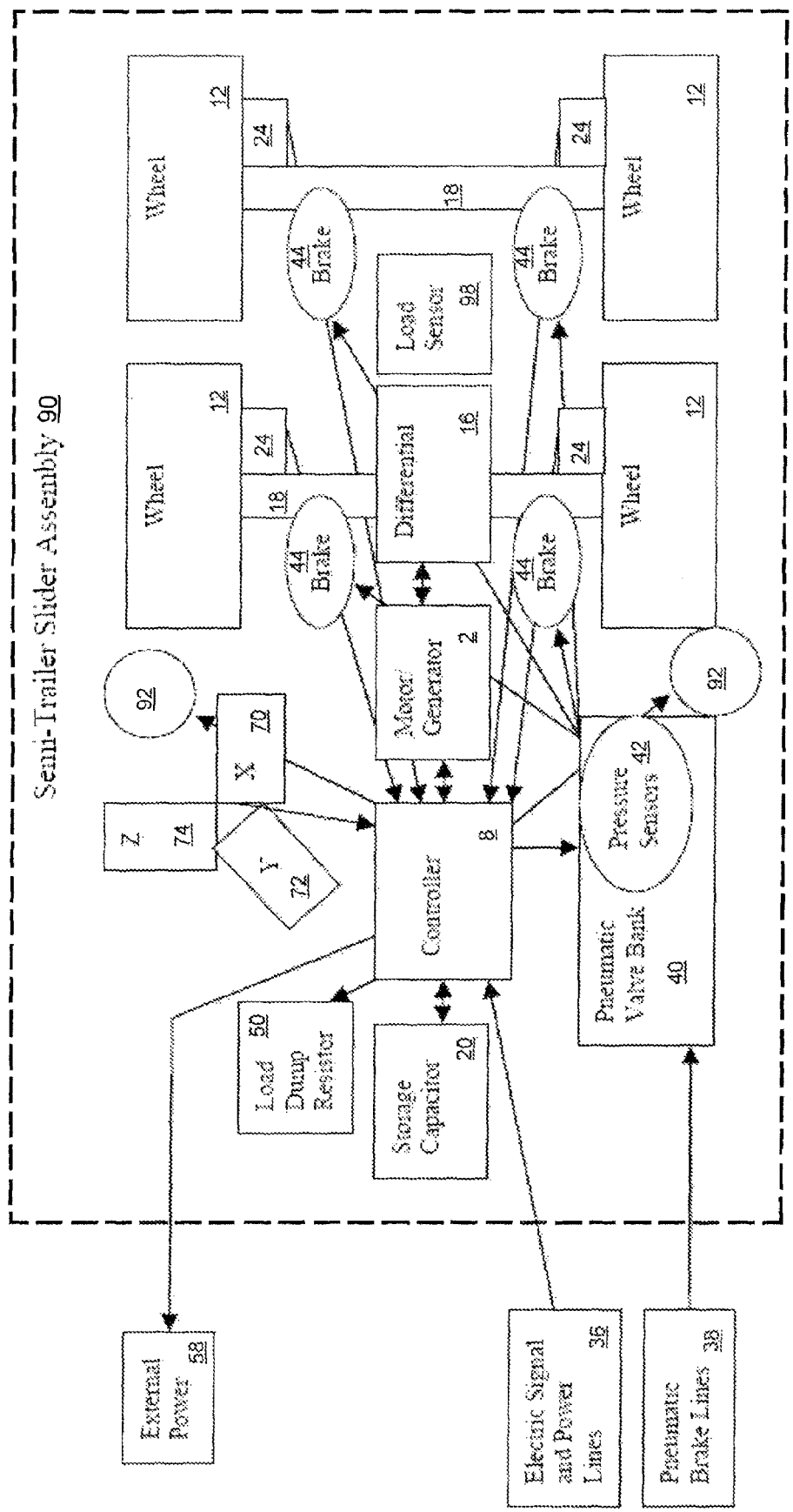
FIG. 6 shows another schematic diagram of a semi-trailer slider assembly in accordance with another embodiment of the present invention.
Figure 7:
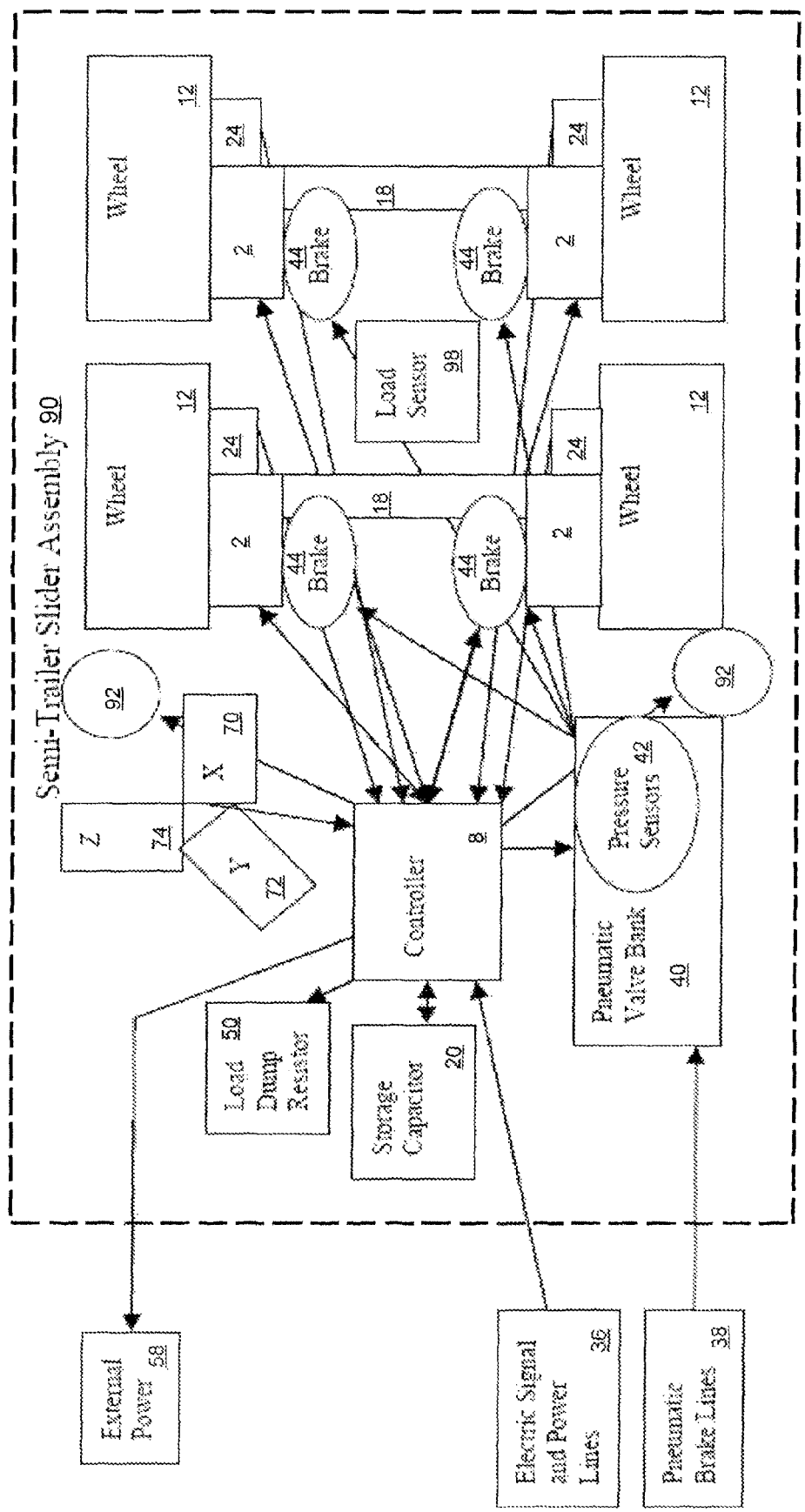
FIG. 7 shows another schematic diagram of a semi-trailer slider assembly in accordance with another embodiment of the present invention.
Figure 8:
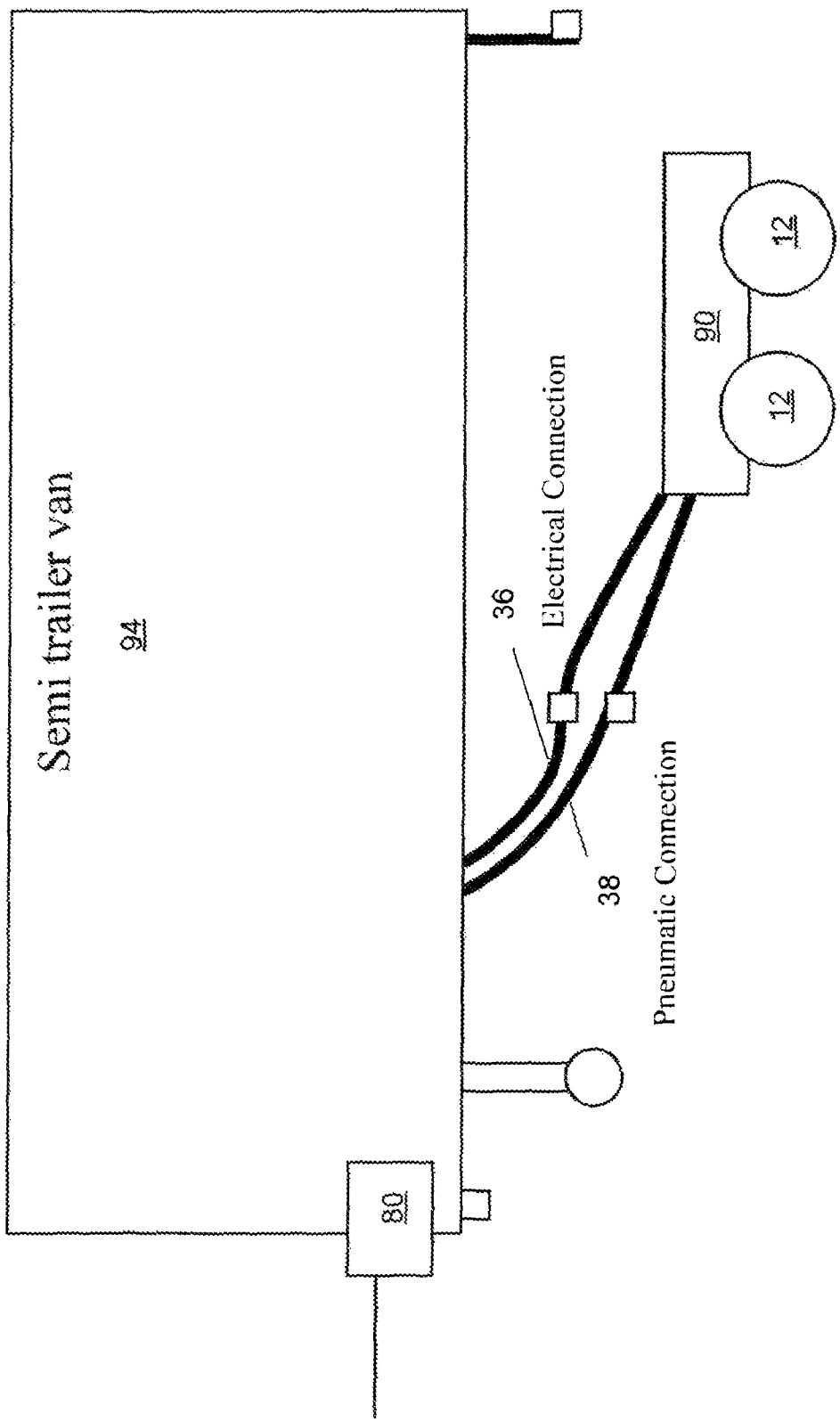
FIG. 8 shows another schematic diagram of a semi-trailer with slider assembly in accordance with another embodiment of the present invention.

In another embodiment, the regenerative braking can be continued after the capacitors or energy storage devices have reached maximum charging capacity. Excess energy could be directed or dumped into load resistors 50, as shown in FIGS. 5-7. This dumping of load can be proportionately applied to both capacitors and resistors as the system reaches maximum charging capacity while still providing maximum braking capacity. By doing this, the trailer maintains even braking and lightens the load on the mechanical braking system. Regenerative braking into the capacitor and/or resistive load along with the pneumatic brakes that are controlled through a pneumatic valve bank eliminates the need for the tractor to implement the need for loud "jake-braking." By applying both regenerative braking and friction braking, the vehicle can brake much faster with shorter stopping distances. This system also reduces wear on the brake system and drive train.

In another exemplary embodiment, the generator portion of the system can be used to supply power to the trailer, such as for refrigeration, heaters, and/or lights. This external power 58 may also be used to energize the cargo, or portions thereof, that the trailer may be carrying.

In another configuration, the present invention can enhance safety by controlling the trailer during a break-away situation. When a break-away situation is detected (such as by a break-away switch 80 tethered from the trailer to the towing vehicle, or by a loss of signal from the pneumatic and/or electrical lines), the electronic controller can apply the brake actuator to apply the brakes and also power the motors (if necessary) to keep the trailer upright and true, and keep the wheels in maximum braking traction to the road. The accelerometer and wheel speed sensor data also can enable the controller to determine the course and direction of the trailer, allowing the controller to apply the proper amount of braking to the respective wheels to keep the trailer on a straight and upright course (thereby preventing the trailer from tipping and rolling over) until it comes to a stop.

In yet another embodiment, the system of the present invention may be embedded within the slider unit 90 of a semi-trailer 94 (see FIGS. 5 to 8). Existing trailers have only pneumatic brake lines 38 attached to the slider from the main body of the trailer. Existing sliders can be moved either forward or backward to help balance the load on the trailer's axles. Because the present invention can be completely contained with the slider unit, existing trailers can be easily retrofitted with the new mechanism. Down times for conversion would be minimal. New trailers being built also would have quicker assembly times with this configuration. The invention would only have the existing pneumatic brake lines reattached (including, but not limited to, with a quick coupler), and a cable to monitor the existing signaling cable 36 (which typically is 7-pin for current semi-trailers) that contains the lines for power, brakes, signals, and marker lamps. The motoring/regenerating on/off can come either manually (such as using a switch on the slider or elsewhere) or remotely (e.g., by monitoring the brake line). In one embodiment using the latter method, if the driver taps in rapid succession a certain number of times (three, for example) on the brakes, the unit would toggle on and off. An indicator light or lamp 92 on a side or each side of the slider unit could be used to indicate its on/off state, and could be positioned to be visible in the rear view mirror of the tractor or pulling vehicle.

The trailer controls may be independent of the towing vehicle or tractor, or may be connected to the towing vehicle. The connection to the trailer controls, wherever located, may be wireless or by wires or lines.

Figure 4:
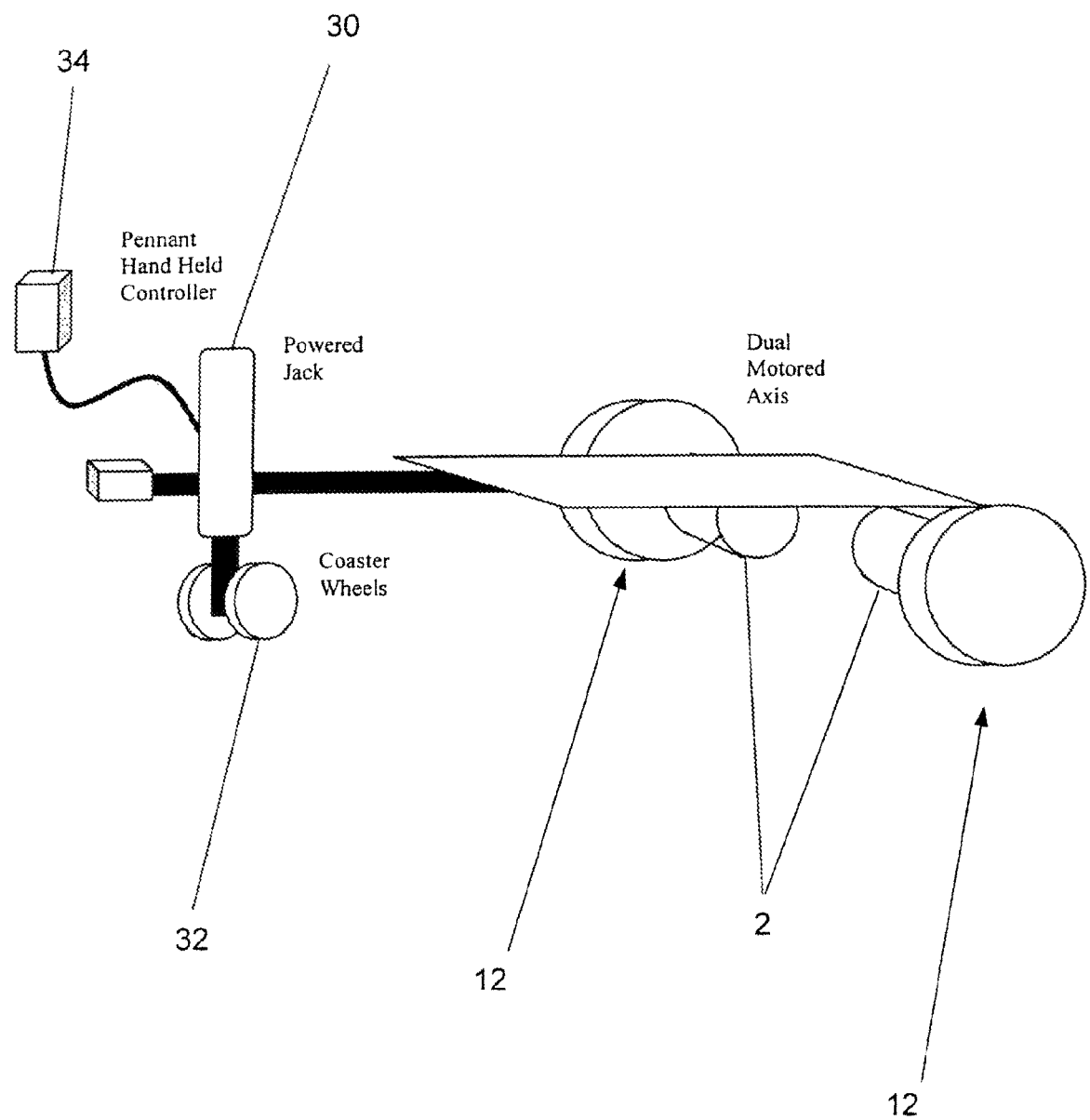
FIG. 4 shows a view of the present invention in use with a powered jack in accordance with another embodiment of the present invention.

The system also may be used for autonomous trailer hitching or movement with a jack 30 on a set of coaster wheels 32 or tracks (which may be useful in muddy conditions) at the hitch beam, as shown in FIG. 4. The jack may be powered. The motor or motors 2 can then be used to drive the trailer in forward or reverse. Where two or more motors are used, the motors can also be used to assist in turning the vehicle, by running the motor on one side and not the other, or running the motor on one side in reverse. The operator can use a controller 34, such as a pennant hand-held controller or wireless device, to control trailer movement. This means of operation can be useful in moving a trailer to a vehicle for hitching, or moving a trailer independently of a towing vehicle, such as moving or backing a trailer into a tight storage or parking spot.

In another embodiment, on-scale or load sensors 98 may be used to gauge the mass of the trailer load. The sensors may be in either load cells, the air suspension systems, or another suitable location. This will help the system calculate how much torque to apply through the motors to help assist the trailer in forward motion (but not too much so as to push the trailer). Similarly, this method can be used to help the brakes provide the right amount of deceleration.

In yet another embodiment, all of the data collected and/or generated by the system can be stored. This storage can be in the controller 8. This data can be retrieved by a laptop, memory stick or device, or by wireless transmission, and used to monitor the driver, the truck, and the load.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

We claim:

1. A regenerative braking system for a towed vehicle, comprising:
   one or more motors mounted on a separate slider unit adapted to be removably attached to a towed vehicle, said motor or motors adapted to recover energy from regenerative braking of the towed vehicle when the slider unit is attached to the towed vehicle;
   an energy storage system mounted on said slider unit in electrical connection with said motor or motors; and
   an electronic controller mounted on said slider unit and adapted to monitor a trailer connection between the towed vehicle and a towing vehicle when the slider unit is attached to the towed vehicle.

2. The system of claim 1, further comprising:
   at least one multiple-axis sensor mounted on the slider unit.

3. The system of claim 1, wherein the energy storage system comprises one or more capacitors or batteries.

4. The system of claim 1, wherein the motor or motors are adapted to apply power to one or more wheels of the towed vehicle when the slider unit is attached to the towed vehicle.

5. The system of claim 1, wherein the electronic controller controls the application of power from the motor or motors based on data from the trailer connection.

6. The system of claim 1, wherein the towed vehicle is a semi-trailer.

7. The system of claim 1, further comprising one or more load resistors connected to the energy storage system.

8. The system of claim 1, further comprising a brake actuator.

9. The system of claim 1, wherein energy generated from the system is used to supply power to cargo being transported on the towed vehicle.

10. The system of claim 1, wherein the system can be turned off from a towing vehicle.

11. The system of claim 1, wherein wheels of the towed vehicle can be independently powered or braked by the system.

12. The system of claim 1, wherein there is a motor for each wheel or axle of the towed vehicle.

13. The system of claim 1, further comprising:
   a load sensor connected to the electronic controller, the load sensor adapted to determine the mass of the load in the towed vehicle, wherein the controller determines the amount of torque the motor or motors need to generate to assist in the acceleration or deceleration of the towed vehicle based on input from the load sensor.

14. The system of claim 1, wherein the motor or motors are switched-reluctance motors.

15. The system of claim 2, wherein the motor or motors are adapted to apply power to one or more wheels of the towed vehicle when the slider unit is attached to the towed vehicle.

16. The system of claim 2, wherein the electronic controller controls the application of power from the motor or motors based on data from the multiple-axis sensor.

17. The system of claim 2, wherein the electronic controller controls the application of power from the motor or motors based on data from one or more of the following: the multiple-axis sensor, the trailer connection, and the wheel speed of the towed vehicle.

18. The system of claim 2, wherein the multiple-axis sensor comprises three axes: an x-axis adapted to monitor the acceleration and deceleration and angle of inclination of the trailer; a y-axis adapted to monitor the turning force and banking of the driving surface; and a z-axis to monitor the smoothness of the driving surface.

19. The system of claim 7, wherein regenerative braking continues after the energy storage system has reached maximum charging capacity by directing excess energy to the load resistors.

20. The system of claim 10, wherein the system can be turned off by three or more taps of a brake on the towing vehicle.

* * * * *